Figure 1:
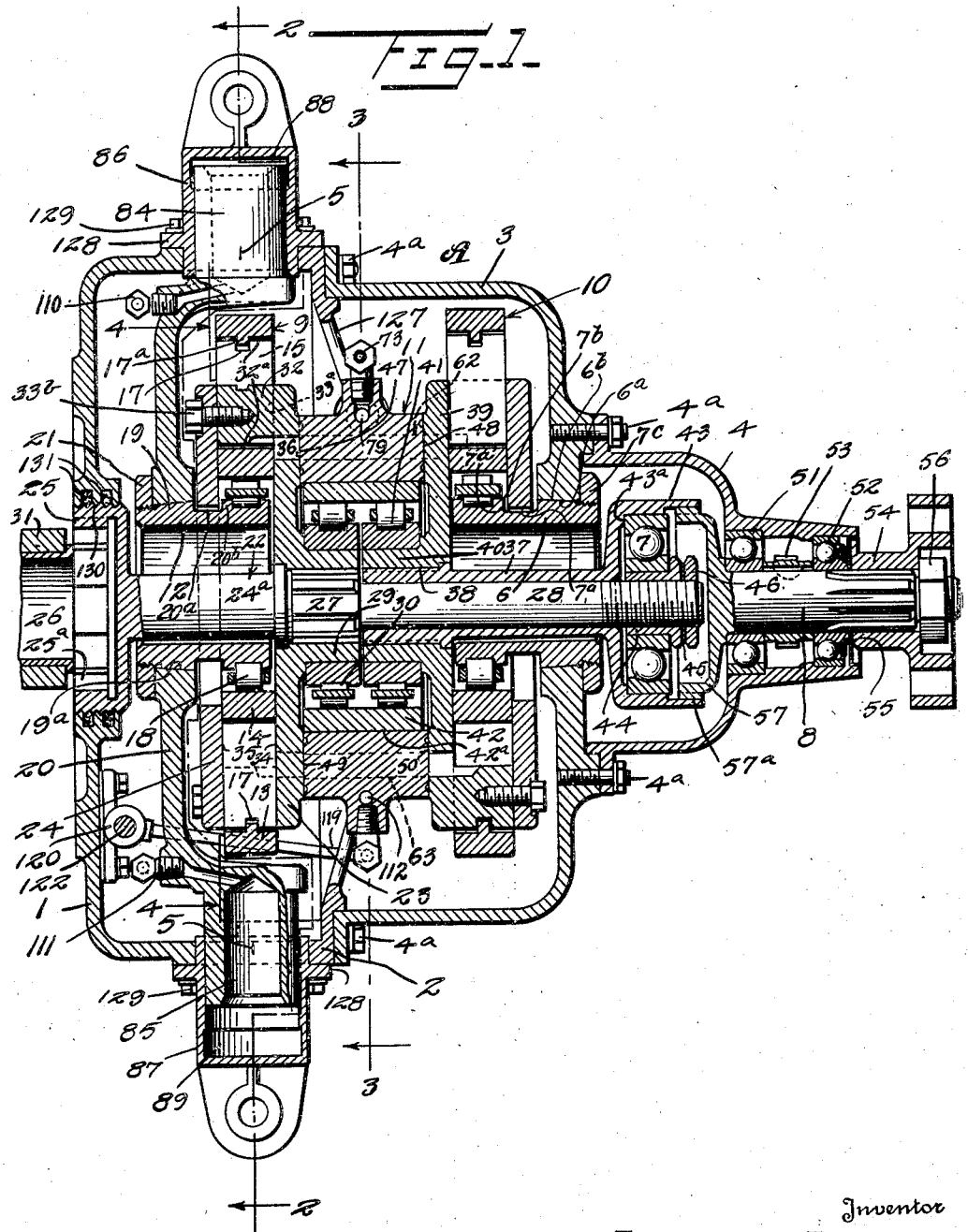

Dec. 24, 1940.  E. L. ROSE  2,226,481

HYDRAULIC TRANSMISSION

Filed June 29, 1938  4 Sheets-Sheet 1

Inventor
EUSTACE L. ROSE,
By Kimmel & Crowell
Attorneys.

Dec. 24, 1940.   E. L. ROSE   2,226,481
HYDRAULIC TRANSMISSION
Filed June 29, 1938   4 Sheets-Sheet 2

Inventor
EUSTACE L. ROSE,
By Kimmel & Crowell,
Attorneys.

Dec. 24, 1940.  E. L. ROSE  2,226,481
HYDRAULIC TRANSMISSION
Filed June 29, 1938  4 Sheets-Sheet 3

Inventor
EUSTACE L. ROSE,
By Kimmel & Crowell,
Attorneys.

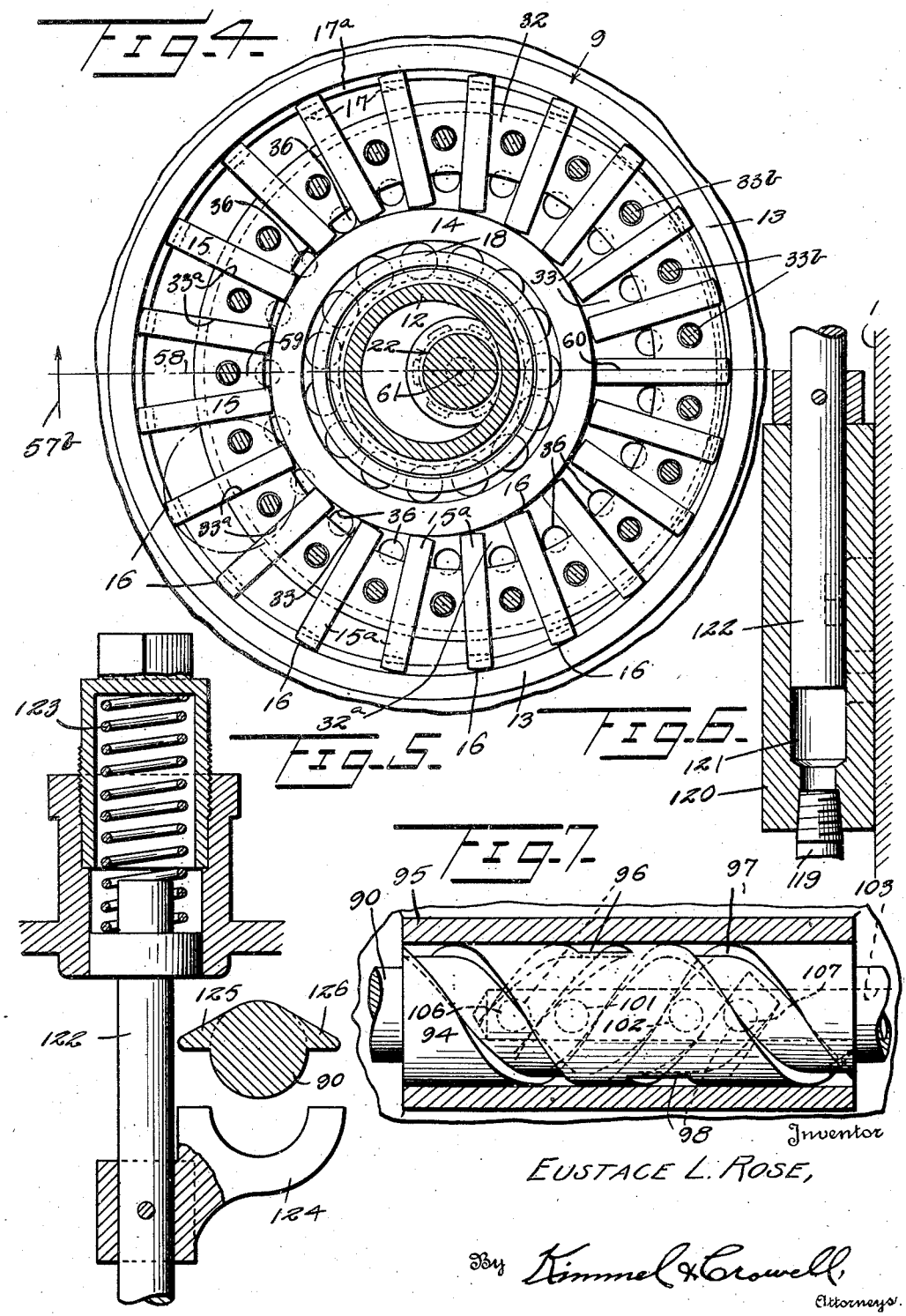

Patented Dec. 24, 1940

2,226,481

UNITED STATES PATENT OFFICE 2,226,481

HYDRAULIC TRANSMISSION

Eustace L. Rose, Charleston, W. Va.

Application June 29, 1938, Serial No. 216,562

4 Claims. (Cl. 60—53)

This invention relates to a hydraulic transmission or fluid gear designed primarily for use in connection with automotive vehicles, but it is to be understood that the transmission or fluid gear, in accordance with this invention is for employment in any connection for which it may be found applicable.

The invention aims to provide, in a manner as hereinafter set forth, a hydraulic transmission or fluid gear which will operate at unusually high speeds, as would be required for automotive use.

The invention further aims to provide a hydraulic transmission or fluid gear constructed in a manner to greatly reduce the velocity of the rubbing surfaces between component parts thereof and which will allow for high speed operation without undue wear.

The invention further aims to provide a hydraulic transmission or fluid gear with means for automatically maintaining the proper ratio balance, when operating under heavy loads, to prevent overloading of the prime mover.

The invention further aims to provide, in a manner as hereinafter set forth, a hydraulic transmission which is simple in its construction and arrangement, strong, durable, compact, readily assembled and installed relative to a prime mover, thoroughly efficient in its use, and comparatively inexpensive to set up.

Embodying the foregoing aims, as well as other aims which may directly or indirectly hereinafter appear, the invention consists of the novel construction, combination and arrangement of parts to be more specifically referred to and illustrated in the accompanying drawings, wherein is shown an embodiment of the invention, but it is to be understood that changes, variations and modifications may be resorted to which fall within the scope of the invention as claimed.

Figure 2:
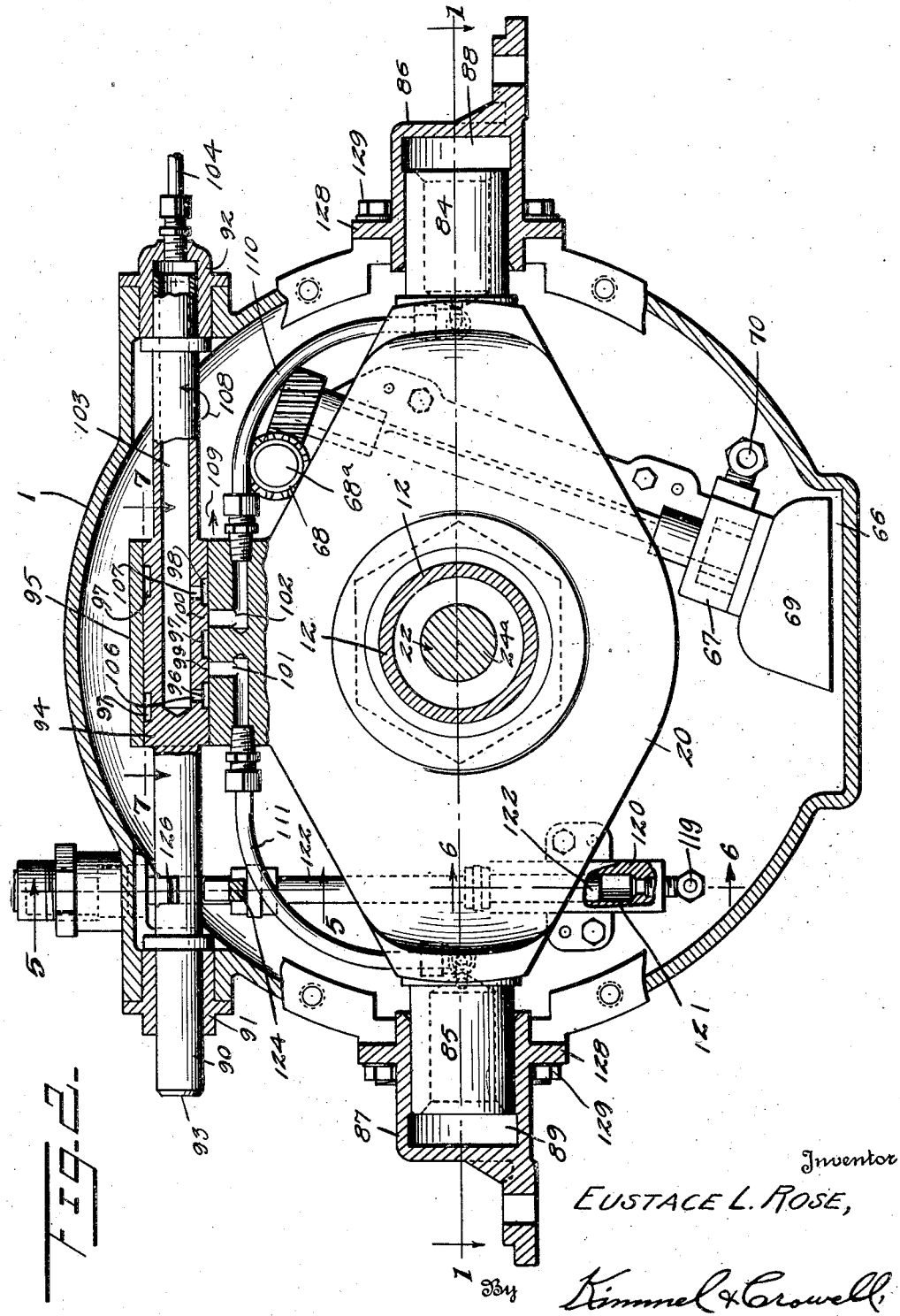
Figure 3:
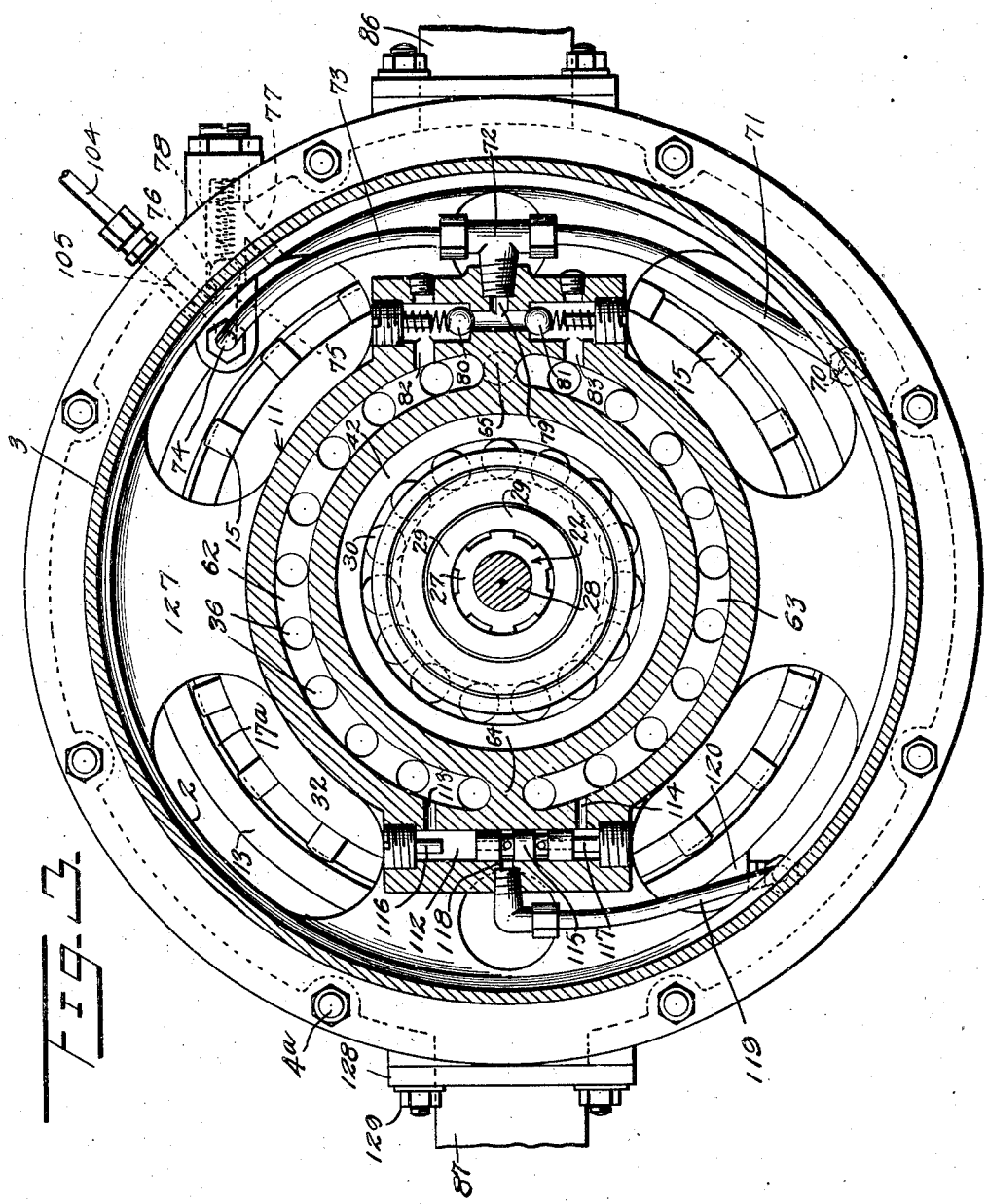

In the drawings:

Figure 1 is a sectional view of the transmission or gear taken on the line 1—1 Figure 2, Figures 2, 3 and 4 are sectional views of the transmission or gear taken respectively on lines 2—2, 3—3 and 4—4 Figure 1, and Figures 5, 6 and 7 are sectional views of the transmission or gear taken respectively on lines 5—5, 6—6 and 7—7, Figure 2.

The transmission or gear includes a housing A made up in four sections 1, 2, 3 and 4 suitably secured together by the holdfast means 4a. The section 1 is adapted to be bolted to the rear end of the engine or prime mover crank case, not shown, and displaces the flywheel housing. The latter is also known as the bell housing. The section 2 carries a stationary fluid transfer means to be referred to which is located between a pair of rotatable units which also will be referred to. The section 2 merges into or joins the section 1 at the point 5, which is the center line of the control cylinders to be referred to. The sections 1 and 2 house one of the units of said pair. The section 3 houses the other unit of said pair and carries a fixed crank member 6 for association with one of the units of said pair. The section 4 houses a thrust bearing 7 and carries a tail shaft 8.

The units of said pair are indicated at 9, 10. The general construction of the units is substantially the same and each is capable of acting as a pump or a motor. In the embodiment of the invention as shown the unit 9 constitutes the pump and the unit 10 the motor. The units 9, 10 will be hereinafter referred to as pump and motor units respectively. The unit 9 is rotated by the engine or prime mover and will produce rotation of the unit 10 by forcing fluid through a fluid transfer means 11, when a hollow bodily shiftable crank member 12, forming a part of unit 9 is displaced from a common center.

The pump unit 9, with reference to Figure 1, and also to Figure 4 is formed of a series of parts which bodily rotate as a whole, but certain of such parts may be shifted or adjusted to travel in a circular path eccentric to the common center of the unit. The parts of unit 9 which may be shifted or adjusted as aforesaid may be termed crank elements. These elements consist of an outer ring 13 and an inner ring 14. The latter also serves the purpose of a bearing race.

The ring 13 encompasses in spaced relation and has its side faces flush with the side faces of the ring 14.

Accurately fitted endwise between the rings 13, 14 is a plurality of radially disposed spaced separators 15 having their ends 15a of arcuate form, which is to be the equivalent of a segment of an arc of a disc having a diameter equal to the length of the separators. The arcuate ends of the separators are indicated at 16 and clearly shown in Figure 4. The ends of the separators fulcrum on the rings 13, 14. The outer ends of the separators 15 are grooved, as at 17 for the purpose of straddling a rib 17a integral with the inner face of ring 13 for maintaining the location of the latter with respect to the ring 14. The structure consisting of the rings 13, 14 and separators 15 are carried by a roller bearing means 18 which is journaled on the shiftable hollow crank member 12. The latter has a tapered part 19 intermediate its ends which fits into an axially arranged tapered opening 19a formed in a bodily movable shifting beam 20. The crank member 12 is provided with a peripheral groove 20a between the tapered part 19 and the part 20b of largest outer diameter of said member. The part 20b is the rear portion of member 12 and it is spaced from the portion 19 by the groove 20a. A stop nut 21, for the beam 20 engages with the member 12. To complete the unit 9 a shaft element 22, a main body element 23 and a cover plate element 24 are employed and such elements rotate about a common or fixed center. The shaft element 22, will be hereinafter termed a shaft and which is the input or drive shaft for the pump unit. The main body element 23, hereinafter termed inner body section is arranged against the inner side surfaces of the ring 14 and projects outwardly to a point in close proximity to ring 13. The cover plate element 24, hereinafter termed outer body section is arranged against the outer side surface of the ring 14 and projects outwardly to a point in close proximity to the ring 13. The shaft 22 includes a reduced inner portion 24a which extends through and is of less diameter than the inner diameter of crank member 12. The shaft 22 also includes an outwardly opening cup-shaped outer portion 25 of materially greater diameter than the portion 24a. The inner face of the shaft portion 25 is splined, as at 25a for accurately fitting the splined outer end of the engine crank shaft 26 whereby shaft 22 will be driven from shaft 26. The shaft 22 intermediate its ends is formed with a spline seat 27 on which is fixed the inner body section 23. The shaft 22 has a reduced portion 28 which is of a length to extend from the splined portion 27 to and through the thrust bearing 7 and which will be more fully referred to. The inner body section 23 has a hub 29 which is journaled in a roller bearing 30. The other journal support being taken on the crank shaft bearing 31.

The inner body section 23 is formed with an annular rim 32 extending between the rings 13, 14 and towards the outer body section 24. The rim 32 forms section 23 of cup-shaped contour and of a depth equal to the width of the separators 15. The inner diameter of the rim 32 is of sufficient size to allow ring 14 to be shifted eccentrically to the common shafts center, a predetermined amount. Between the inner surface of the rim 32 and the outer surface of the ring 14 is left a circular space or void 32a which varies in magnitude around its circumference when the rings are displaced in eccentric relation as shown in Figure 4. The rim 32 is formed with spaced radially disposed slots 33a in which the separators 15 are accurately, but slidably fitted.

The separators 15 divide the circular space or void aforesaid into a series of chambers 33 capable of being made to expand and contract when rotating, by shifting the crank 12 and rings 13, 14 eccentrically. The chambers 33 are completed by bolting the outer body section 24 to the rim 32 of the inner body section, as at 33b. The separators 15 and the ring 14 are fitted between the faces 34, 35 respectively, of the inner and outer body sections with a slidable, but sealing engagement.

Each chamber 33 has a fluid channel 36 (Figures 1 and 4). The fluid channels pass through the inner body section 23 and communicate with the fluid transfer means 11 as shown in Figure 1.

The motor unit 10 is of the same general construction as the pump unit 9, with the exception, that it is oppositely disposed and the crank member 6 has a fixed throw. The member 6 includes a tapered part 6a intermediate its ends which fits into an axially arranged tapered opening 6b formed in the section 3. The member 6 is formed with an annular peripheral groove 7a. The member 6 includes a portion 7b of largest outer diameter which is the front portion of member 6. The groove 7a is interposed between the portions 6a and 7b of member 6. Threadedly engaging with the member 6 and bearing against section 3 is a stop nut 7c. The motor unit includes a shaft 37 revolubly mounted around the shaft part 28 and which has a splined seat 38, upon which is fixed the inner body section 39 of unit 10. The section 39 has a hub 40 which is journaled in the roller bearing 41. A bearing race member 42 for the bearing 41 is fixed in a central bore 42a through the fluid transfer means 11. The race 42 is common to both bearings 30 and 41. The motor shaft 37 is of tubular form and provided with a cup 43 at its outer end and in which is formed a seat 43a for the thrust bearing 7. The reduced portion 28, of pump shaft 22, passes through both the hollow motor shaft 37 and the thrust bearing 7 and has mounted thereon a bearing seat 44. The outer end of this shaft portion 28 is threaded to receive the bearing seat 44, which after being properly adjusted is locked in position by the lock washer 45, and nut 46. The object of this construction, is, to furnish an adjustable free running retaining means to maintain a sealing engagement between the inner body sections 23 and 39, and the fluid transfer means 11, as indicated at 47, 48, 49 and 50.

The tail or output shaft 8 is journaled in the housing section 4 by the bearings 51 and 52 which have a speedometer drive gear 53 arranged therebetween. The gear 53 constitutes a spacer for bearings 51, 52. A standard universal power transmission element 54, is shown as splined on the rear end of shaft 8 with a slinger cup 55 being disposed between its hub, and the inner race of bearing 52. All of the elements mounted on shaft 8 are secured in place by the nut 56. The inner end of the output shaft 8 terminates in a cup 57, which is splined around its outer periphery to accurately fit the female splined portion 57a of cup 43. This furnishes an outboard support to the motor shaft 37, and puts the two shafts 37 and 8 into driving engagement with each other.

If the pump unit 9 was being rotated in a direction indicated by the arrow 57b in Figure 4 and the crank member 12 displaced in the direction of a definite center line 58, the chambers 33, will be caused to expand on the upper side of the center line, from point 59 to 60, and will contract on the lower side from point 60 to 59. In this manner, fluid is drawn into chambers 33 through the fluid channels 36 on one side of the center line 58 and discharged on the other. The flow of fluid through this pump can be regulated to any desired quantity to zero by moving the crank member 12 toward the common shaft center 61, or the flow reversed by a continued movement beyond center without reversing the rotation of the pump.

The fluid transfer means 11 as before stated is interposed between the pump unit and the motor unit, and with reference to Figure 3 it includes a pair of arcuate shaped transfer ports 62 and 63, which coincide with the fluid channels 36, and have partitions or separators 64 and 65 between their ends which accurately equal the diameter of the fluid channels 36, thus the pump inlet, or low pressure side of the circuit is separated from the pump discharge, or high pressure side. Neither the transfer port 62 or 63, is specifically, the high, or low pressure port, but one always acting opposite to the other as would be the case when the crank member 12 is moved across center to reverse the pump flow. The motor unit 10, is a duplicate of the pump unit shown in Figure 4, but has its crank member 6 fixed in a permanent offset position, as shown in Figure 1. When the pump unit 9 is being driven by a prime mover, it will discharge no fluid if the crank member 12 is moved to coincide with the shaft center 61, but if the crank member is displaced in either direction there will be a discharge, in proportion to the displacement, into one of the arcuate transfer ports 62 or 63, Figure 3, through the fluid channels 36 of the pump unit, this being termed the high pressure port. The fluid being non-compressible will pass through the fluid channels of the motor unit into the chambers of such unit. The pressure of the fluid acting to expand the chambers in the motor unit will produce rotation in the motor unit, with a speed that will receive the discharge from the pump. After these chambers pass over the center line of the partition or separator 65, Figure 3, they will begin to contract, returning the fluid to the opposite or low pressure transfer port, where it will again be taken into the pump. The farther the crank member 12 is displaced from the shaft center 61, the greater will be the pump unit discharge, which will drive the motor unit faster to receive it. If the crank member 12, is brought to center then displaced to the opposite side, this will reverse the flow of fluid through the pump unit. The high pressure transfer port will become the low, and the low the high, this will produce reverse rotation in the motor, thus an infinitely variable speed of rotation, within certain limits, can be obtained in either direction by displacing the crank member 12 to one side or the other of the shaft center 61. In operation it is necessary that all voids in the pump and motor units as well as the transfer ports be filled with fluid at all times. Some fluid is lost through leakage and lubrication and must be made up from some outside source.

In Figure 2 the housing is shown as provided with a sump 66, on which is carried a reserve supply of fluid for leakage makeup, and to operate the hydraulic speed control, which will be hereinafter described. A servo-pump 67 is carried by the housing, driven by a spiral gear 68 mounted on the end of the prime mover cam shaft 68a and is continuously driven so long as the prime mover is operated. The pump 67, takes the fluid from the sump 66 through a strainer 69 and discharges it through an outlet 70, into the conducting pipe 71 (Figure 3) through the T 72 and conducting pipe 73 to the point 74. Here the fluid enters the channel 75 forcing the relief valve 76 from its seat and returns to the sump through the channel 77. This flow of fluid is continuous during the operation of the transmission, and has a low pressure which is regulated and maintained by the spring 78. This low pressure is conducted by T 72 into the fluid channel 79 between the valves 80 and 81, which controls communication with channel 79 and the transfer ports 82 and 83, through fluid channels 82 and 83. The valve exposed to the high pressure transfer port will be held to its seat, while the fluid from the pump 67 will force the other valve from its seat and allow leakage makeup fluid to enter the low pressure transfer port. In this manner leakage makeup fluid is fed into the hydraulic circuit at all times during operation, regardless of which way the fluid is circulating through the transfer ports.

The pump unit crank member 12 (Figure 1), as previously described is fixed in the shifting beam 20. At either end of this shifting beam is a curved offset portion terminating on an integral hollow piston 84 and 85. The center line through these pistons coincide with the center of the crank bearing 18 for the purpose of load balance. The shifting beam 20 is slidably mounted in the cylinders 86 and 87 as shown in Figure 1, bolted to two oppositely disposed points on the case sections 1 and 2. The disposition of the cylinder chambers 88 and 89, is, to shift the beam 20 endwise if the fluid from the pump 67 is allowed to enter one while the other is placed into communication with the casing interior.

The flow of fluid to and from the cylinder chambers 88 and 89 is controlled by a rock shaft 90, Figure 2, which is carried by the bearings 91 and 92 fixed in the housing section 1. This shaft is disposed to be actuated by a foot pedal or lever, not shown fixed on the end indicated at 93.

The rock shaft 90 has an enlarged central portion 94, accurately but slidably fitted in the boss 95 which is an integral part of the shifting beam 20. In this enlargement are three ports 96, 97 and 98.

These ports in reality are spiral grooves as shown in Figure 7. The port 97 spirals from one end of the enlargement 94 to the other allowing it to communicate with the outside. The ports 96 and 98 have a spiral of a predetermined length, but end blindly within the confines of the boss 95. Due to these spiral ports, if the rock shaft were rotated slightly back or forth it would be equivalent to moving the ports endwise. Between the ports 96, 97 and 98 are two lands 99 and 100. These lands are of a width which accurately cover the fluid channels 101 and 102 formed in the beam 20. Fluid from the pump 67 enters a fluid channel 103, provided in the rock shaft 90, through the fluid conducting pipe 104, of which the other end is shown connected to channel 105, Figure 3. The fluid after entering channel 103 is conducted to the ports 96 and 98, through the fluid channels 106 and 107. If the rock shaft 90 was rotated forward, as indicated by the arrow 108, part of a revolution, the ports 96, 97 and 98 would be displaced endwise in relation to the channels 101 and 102 in a direction indicated by the arrow 109. This would place the fluid channel 102 in communication with the casing interior through the spiral port 97, allowing the fluid in the beam cylinder chamber 88 to be discharged through the conducting pipe 110. The fluid channel 101 is placed in communication with the spiral port 96, allowing fluid from the pump 67 to enter the beam cylinder chamber 89, through the fluid conducting pipe 111. This will cause the shifting beam 20 to move in a direction following the ports until the fluid channels 101 and 102 are again closed by the lands 99 and 100. If the rock shaft 90 be rotated in the opposite direction the fluid channel 102 will communicate with the pump 67 through the spiral port 98, while fluid channel 101 will communicate with the casing interior through the spiral port 97. This will reverse the disposition of the beam cylinder chambers 88 and 89, causing the beam 20 to shift in the opposite direction until the fluid channels 101 and 102 are closed by the lands 99 and 100. In this manner the shifting beam 20 which carries the pump unit crank member 12, is caused to follow up any endwise displacement of the spiral ports produced by rocking the shaft 90 to or fro.

If the pump unit crank member 12 Figure 1 was displaced from the common shaft center an amount equal to the fixed throw of the motor unit crank member 6, the driving ratio would be one to one, this being the standard practice in automotive transmissions.

Where the load becomes too great for the prime mover, as would be the case when climbing a steep grade, it is necessary to reduce this ratio. In this fluid transmission the ratio is reduced by shortening the throw of the pump unit crank member 12, which is accomplished by rocking the shaft 90, the necessary amount in the required direction.

The rock shaft 90, in addition to being manually controlled, has an automatic control to prevent overloading the prime mover independently of the operator. When the transmission is operating, the fluid in the high pressure transfer port, between the pump and motor units, will assume a pressure which is in proportion to the load being transmitted. The heavier the load, the higher becomes the fluid pressure. The transfer ports 62 and 63 (Figure 3) communicate with opposite ends of a cylindrical bore 112 through fluid channels 113 and 114. Within the bore 112 is a piston 115 which is slidably fitted to act as a seal, preventing the passage of fluid between the transfer ports 62 and 63. The endwise travel of this piston is limited between the fluid channels 113 and 114, by the stops 116 and 117. Regardless of which transfer port is the high pressure port the piston 115 will be forced to the stop on the low pressure side. This will allow the high pressure port to communicate with the centrally located outlet 118, and at the same time leave a seal between the two ports. The position of piston 115, Figure 3, indicates that transfer port 62 is the high pressure port. If the transmission was reversed, transfer port 63 would become the high pressure port, forcing the piston 115 to the stop 116 and thereby make communication with the outlet 118. Fluid from the high pressure transfer port, regardless of which one it may be, will automatically make communication with the outlet 118.

The fluid is conducted from outlet 118 by the pipe 119 to the bottom of a cylinder 120, Figure 2, where it enters the chamber 121. If the load being transmitted by the fluid gears becomes excessive, this will cause a pressure rise in the chamber 121, which will force the piston 122 upward, compressing the reactance spring 123 (Figure 5) an amount in proportion to the load. Fixed on the piston 122 is a bracket 124. Directly over this bracket 124 are two lugs 125 and 126, which are made integral to the rock shaft 90.

These lugs are shown in the neutral position. If the shaft 90 is rocked in either direction, for forward or reverse, one or the other of the lugs, 125 or 126 will be brought into contact with the bracket 124. The reactance spring 123 is adjusted to impose a predetermined load on the prime mover, and when this is exceeded, the excess pressure from the transfer port will act to compress the spring 123, allowing the bracket 124 to rise and rock the shaft 90 toward the neutral position. This action progresses until the shifting beam 20 has shortened the throw of the pump crank member 12, to a point where the load and ratio will be in the proper balance with the prime mover.

The housing section 2 is provided with a suspension means 127 for the fluid transfer means 11. The cylinders 86, 87 in proximity to their inner ends are formed with peripheral flanges 128 which are secured to the housing sections 1, 2 by the holdfast means 129.

The housing section 1 has an axial opening 130 into which extends the cup-shape portion 25 of the shaft 22. The wall of opening 130 is provided with inset packing rings 131 which bear on said portion 25.

The annular rim 32 and the ring 14 constitute respectively outer and inner wall forming elements common to the chambers 33. The outer body section of the units 9, 10 constitute outer end wall forming elements common to the chambers 33. The inner body section of the units 9, 10 constitute inner end wall forming elements common to the chambers 33. The separators 15 constitute the front and rear walls of chambers 33. The fluid channels for the chambers 33 are formed in the inner side walls of the chambers. The rings and partitions of each unit are slidably adjustable relative to the body sections of the unit.

The crank member 6 intermediate its ends is formed with a beveled peripheral portion 6a which bears against the wall of a tapered opening 6b formed with the section 3 of the housing A. The member 6 carries a stop nut 6c on its outer end which abuts housing section 3. The outer body sections of the unit extend into peripheral grooves 7a formed in the crank members 6 and 12. The inner body sections of the units oppose the inner end surfaces of the crank members 6 and 12. The latter is suspended from and bodily moves with the shifting beam 20.

The initial priming of the transmission is obtained by placing the required amount of fluid in the sump 66 and starting the prime mover. The servo pump 67 will very shortly exclude the air and fill the chambers and channels with fluid.

As heretofore set forth the structure defined provides for two rotatable hydraulic units, with a transfer means interposed between them to transfer fluid from one to the other. One unit is equipped with a hollow shaft, having a thrust bearing seat at its outer end, and acting also as a detainer. The other unit has as an element thereof a shaft which extends through a central opening in the transfer means and the aforementioned other shaft and has an adjustable thrust bearing mounted on its free end to act as a retainer to maintain a sealing engagement, between the rotating units and the stationary transfer means. The thrust bearing as aforesaid engages the seat aforesaid.

With respect to the operation of the structure, the transmission consists of two rotating units 9 and 10 with the transfer means interposed between them and with the aforesaid elements being held in sealing engagement by the means as referred to. The rotating unit 9 is adapted to be driven by a prime mover and such unit acts as a variable volume pump. The rotating unit 10 is adapted to act as a fluid motor to receive fluid from the pump and produce rotation.

The transfer means has two arcuate ports 62 and 63, these ports are adapted to carry the fluid to and fro between the pump and motor units. The fluid discharged from the pump passes through one of these ports and after producing the required rotation in the motor, it is carried around to the other port, and will be discharged back to the pump.

The direction of rotation of the motor unit, is controlled by which way the crank member 12 in pump unit 9 is moved from the center. Also, the farther the crank member is displaced from the center, the greater will be the discharge from the pump, which will increase the rotation of the motor unit in proportion. Moving the crank member 12 back to center, the pump discharge will become nil, producing no rotation in the motor unit. By continuing the crank movement to the opposite side of center, the pump unit will discharge into the opposite transfer port reversing the flow of fluid and drive the motor unit in the opposite direction.

The crank member 12 is carried by the shifting beam 20, which is supported in the cylinders 86 and 87. The cross-wise movement is obtained by admitting fluid under pressure, to the cylinder chamber 88, at the same time allowing an equal amount to escape from chamber 89 or reversing this procedure to move in the opposite direction.

The servo pump 67, is adapted to be driven by the prime mover and furnish fluid under low pressure for leakage makeup, and to operate the crank shifting beam.

The fluid supply is carried in sump 66, where it enters the intake 69 and is discharged from the outlet 70, passing through the fluid conducting pipes, 71, 73 and 104.

The fluid necessary for leakage makeup, is conducted by the T 72, to the channel 79, where it will pass through the valve 80 or 81 to the low pressure side of the circuit.

All surplus fluid in the servo line will pass through the relief valve 76 and return to the sump through channel 77. Fluid from conducting pipe 104, enters the channel 103 in rock shaft 90, which leads to the control valve that actuates the crank shifting beam 20. This valve is housed by a boss 95 which is integral with the shifting beam and is adapted to produce endwise motion to the beam by rocking the shaft 90.

The valve ports are in the form of a spiral, so that rotation gives the equivalent to endwise movement.

When the ports are shifted endwise, servo fluid is communicated to one end of the shifting beam, while the other is opened to allow the fluid to discharge. Discharging fluid enters the spiral port 97 which spirals to the open ends of the valve housing.

Spiral ports 96 and 98, which carry the servo fluid, end blindly within the boss 95.

The fluid channels 101 and 102 are normally in the closed position but due to the fact that they are in the shifting beam, any endwise movement of the spiral ports will set up a communication of fluid channels that will cause the shifting beam to follow the movement until the fluid channels 101 and 102 are again closed. In this manner any degree of rocking motion of shaft 90 will produce a proportionate amount of crosswise motion in the crank shifting beam.

It will be assumed that the transmission is installed in an automotive vehicle and there is a foot pedal mounted on the rock shaft 90 at the end 93.

When the operator starts the engine the servo pump 69 will also be driven, furnishing fluid for the control valve on rock shaft 90. If the operator desires to move forward, the foot pedal is rocked the desired amount in the forward direction which will, through the control valve cause the shifting beam to carry the crank member 12 off center, setting up a discharge from the pump unit 9, which will act through the transfer means to produce rotation in the motor unit 10. Rocking the foot pedal in the opposite direction from center position, will produce reverse rotation for backing up. Also a variable speed ratio between the prime mover and the final drive is obtained by the amount the pedal is displaced from the neutral center.

The fluid discharge from the pump to the motor unit will create a pressure in the transfer port 10 in proportion to the load being transmitted. This pressure communicates through valve 118, fluid conducting pipe 119 to the lower end of cylinder 120. As the pressure increases, it will act to force piston 122 upward against the reactance spring 123. The greater the load being driven the higher will become the pressure, compressing the reactance spring in proportion. Piston 122 has a bracket 124, mounted thereon, which is adapted to contact the lugs 125 and 126, which are integral with the rock shaft 90. If the rock shaft is rocked off of center position in either direction in case of overload, the bracket 124 will contact one of the rock shaft lugs, forcing the shaft towards the neutral position. If the overload should become great enough, the rock shaft will be moved to the neutral position, so that there will be no discharge from the pump unit 9.

What I claim is:

1. In a hydraulic transmission, a driven, rotatable fluid pumping unit, a fluid-driven, rotatable motor unit, a stationary fluid transfer means interposed between and transferring fluid from one unit to the other, said means having a central opening, one of said units including a part abutting said means, a hollow shaft having a thrust bearing seat at its rear end acting as a detainer, the other of said units including a part abutting said means, a driving shaft extending through said opening and through said hollow shaft and having an adjustable thrust bearing on its rear end engaging said seat, said bearing when adjusted constituting a retainer for pressing said parts into engagement with said means to thereby maintain sealing engagement between said means and units.

2. In a hydraulic transmission, a driven, rotatable fluid pumping unit, a fluid-driven, rotatable motor unit, a stationary fluid transfer means interposed between and transferring fluid from one unit to the other, said means having a central opening, one of said units including a part abutting said means, a hollow shaft having a thrust bearing seat at its rear end acting as a detainer, the other of said units including a part abutting said means, a driving shaft extending through said opening and through said hollow shaft and having an adjustable thrust bearing on its rear end engaging said seat, said bearing when adjusted constituting a retainer for pressing said parts into engagement with said means to thereby maintain sealing engagement between said means and units, each of said units including a hub extending into said opening, and bearing means interposed between said hubs and said transfer means.

3. In a hydraulic transmission, a driven, rotatable fluid pumping unit, a fluid-driven, rotatable motor unit, a stationary fluid transfer means interposed between and transferring fluid from one unit to the other, said means having a central opening, one of said units including a part abutting said means, a hollow shaft having a thrust bearing seat at its rear end acting as a detainer, the other of said units including a part abutting said means, a driving shaft extending through said opening and through said hollow shaft and having an adjustable thrust bearing on its rear end engaging said seat, said bearing when adjusted constituting a retainer for pressing said parts into engagement with said means to thereby maintain sealing engagement between said means and units, each of said units including an inner and outer ring disposed in spaced relation and having interposed therebetween and fulcruming thereagainst radially disposed spaced separators and an annular rim interposed between said rings and through which said separators slidably pass, the said rim, separators and inner ring of each unit coacting to provide independent extensible and contractable fluid receiving chambers for communication with said fluid transfer means, said pumping unit including an adjustable crank member for adjusting the rings of such unit off center with respect to the axis of the unit for varying the area of one chamber with respect to an adjacent chamber of such unit, said motor unit including a fixed crank member normally disposed eccentrically with respect to the axis of such unit for varying the area of one chamber with repect to an adjacent chamber of such unit.

4. In a hydraulic transmission, a driven, rotatable fluid pumping unit, a fluid-driven, rotatable motor unit, a stationary fluid transfer means interposed between and transferring fluid from one unit to the other, said means having a central opening, one of said units including a part abutting said means, a hollow shaft having a thrust bearing seat at its rear end acting as a detainer, the other of said units including a part abutting said means a driving shaft extending through said opening and through said hollow shaft and having an adjustable thrust bearing on its rear end engaging said seat, said bearing when adjusted constituting a retainer for pressing said parts into engagement with said means to thereby maintain sealing engagement between said means and units, each of said units including an inner and outer ring disposed in spaced relation and having interposed therebetween and fulcruming thereagainst radially disposed spaced separators and an annular rim interposed between said rings and through which said separators slidably pass, the said rim, separators and inner ring of each unit coacting to provide independent extensible and contractable fluid receiving chambers for communication with said fluid transfer means, said pumping unit including an adjustable crank member for adjusting the rings of such unit off center with respect to the axis of the unit for varying the area of one chamber with respect to an adjacent chamber of such unit, said motor unit including a fixed crank member normally disposed eccentrically with respect to the axis of such unit for varying the area of one chamber with respect to an adjacent chamber of such unit and means for adjustably positioning said displaceable crank member off center in opposite directions with respect to the axis of the pumping unit.

EUSTACE L. ROSE.